United States Patent
Kim

(10) Patent No.: US 7,145,872 B1
(45) Date of Patent: Dec. 5, 2006

(54) METHOD FOR MANAGING SYSTEM RESOURCES IN NETWORK SYSTEM IN WHICH DIGITAL INTERFACE IS USED FOR CONNECTION

(75) Inventor: Do-hyoung Kim, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 1137 days.

(21) Appl. No.: 09/624,348

(22) Filed: Jul. 24, 2000

(30) Foreign Application Priority Data

Jul. 26, 1999 (KR) .................................. 99-30336

(51) Int. Cl.
*H04J 3/16* (2006.01)
*H04N 7/173* (2006.01)

(52) U.S. Cl. ...................... 370/230; 370/235; 370/437

(58) Field of Classification Search ................ 370/464, 370/468, 498, 563, 254, 255, 257, 235, 401, 370/431, 437, 465; 709/226, 227, 229; 710/240, 710/241, 305, 309
See application file for complete search history.

(56) References Cited

U.S. PATENT DOCUMENTS

| | | | | |
|---|---|---|---|---|
| 5,881,300 A | * | 3/1999 | Chen ........................... | 713/340 |
| 6,128,316 A | * | 10/2000 | Takeda et al. ............... | 370/468 |
| 6,272,546 B1 | * | 8/2001 | Ludtke ........................ | 709/231 |
| 6,456,714 B1 | * | 9/2002 | Shima et al. .......... | 379/399.01 |
| 6,539,450 B1 | * | 3/2003 | James et al. ................ | 710/306 |

FOREIGN PATENT DOCUMENTS

| | | |
|---|---|---|
| EP | 0 682 430 A2 | 11/1995 |
| EP | 0 862 295 A1 | 9/1998 |
| WO | WO 97/35410 A1 | 9/1997 |

OTHER PUBLICATIONS

Yin Bao and Adarshpal S. Sethi, *"OCP_A: Efficient QoS Control Scheme of Real Time Multimedia Communications,"* Aug. 1997; pp. 741-745; Department of Computer and Information Sciences, University of Delaware, Newark, DE.

Printer Working Group C (PWG-C), Sub-working Group 2 (SWG-2), *"PWG-C Proposal to the 1394 Trade Association AV WG: AV/C Managed Asynchronous Serial Bus Connections,"* Jul. 7, 1998; Draft 1.00; pp. 1-90; San Jose, CA, USA.

Eduardo Takahashi, et al. "A Programming Interface for Network Resource Management" IEEE paper (laid-open on Mar. 26-27, 1999) pp. 34-44.

* cited by examiner

*Primary Examiner*—Doris H. To
*Assistant Examiner*—Soon D. Hyun
(74) *Attorney, Agent, or Firm*—Sughrue Mion, PLLC

(57) ABSTRACT

A method for managing system resources in a network system in which a digital interface is used for connection is provided. The method for managing system resources required for communication between a source device and a sink device includes the steps of (a) initially allocating system resources presently required to the source device, (b) monitoring the format of the output bit stream of the source device in a state in which communication between the two devices is maintained, (c) allocating additional system resources to the source device or releasing redundant system resources from the source device, under the lead of the source device when it is determined as a result of monitoring that the requirements for system resources have changed, and (d) detecting final system resources and releasing the detected system resources when communication between two devices is terminated.

8 Claims, 4 Drawing Sheets oPCR

METHOD FOR MANAGING SYSTEM RESOURCES IN NETWORK SYSTEM IN WHICH DIGITAL INTERFACE IS USED FOR CONNECTION

BACKGROUND OF THE INVENTION

1. Field of the Invention

The present invention relates to a network system, and more particularly, to a method for managing system resources in a network system in which a digital interface is used for connection.

2. Description of the Related Art

Recently, a variety of types of digital devices, such as digital televisions (DTVs), digital video cameras (DVCs), digital versatile disk players (DVDPs) and digital set-top boxes, have been developed. For construction of a network of digital devices, an IEEE1394 standard which is approved as a digital interface by the IEEE committee has been considered.

In particular, in a network system in which a digital interface such as IEEE1394 is used for connection, connection management among a plurality of digital devices is defined by an IEC61883 standard. This standard defines an input plug as an inlet for receiving a bit stream and an output plug as an outlet for outputting a bit stream with respect to each digital device. This standard also defines an output master plug register (oMPR), an output plug control register (oPCR), an input master plug register (iMPR) and an input plug control register (iPCR) as registers for controlling input plugs and output plugs. Digital devices control the input and output plugs by managing registers such as oMPRs, iMPRs, oPCRs and iPCRs, thereby managing an isochronous bit stream connection between digital devices. Representative types of connection among a plurality of digital devices are point-to-point connection and broadcast connection. Point-to-point connection comprises an input plug, an output plug and a channel between the input and output plugs. A device can establish or overlay connection, perform disconnection, and release the resources which may be, for example, a channel and a bandwidth for the connection according to point-to-point connection. Broadcast connection includes broadcast-in connection and broadcast-out connection. Broadcast-in connection is connection between an input plug and a channel. Broadcast-out connection is connection between an output plug and a channel. In broadcast connection, connection can be established only by a corresponding device to actually input or output a bit stream, but a break of the connection and release of resources can be performed by another device, as well as the corresponding one, over a network.

Establishment or break of point-to-point connection and broadcast connection is performed by managing registers such as iMPR, oMPR, iPCR and oPCR. When a device needs allocation and release of resources, the device communicates with a device serving as an isochronous resource manager (IRM) in an overall network system.

FIG. 1 is a diagram showing an example of a network system in which digital devices are connected through IEEE1394. Referring to FIG. 1, a set-top box (STB) 110, which is a source device, is connected to a digital television (DTV) 100, which is a sink device, through an IEEE1394 line. The isochronous connection between the DTV 100 and the STB 110 is established such that a user selects the STB 110 from a display for source device selection on the screen of the DTV 100 using a digital television remote controller (not shown), and then software corresponding to the selection, which is internally included in the DTV 100, operates, thereby initializing the connection between the DTV 100 and the STB 110. In the usual isochronous connection between a sink device and a source device, the sink device functions as an establisher and performs allocation of system resources, which may, for example, be a channel and a bandwidth, for the connection.

The allocation of system resources is achieved by communicating with an isochronous resource manager (IRM) in a network. When the allocation of a channel is required of the IRM, the IRM allocates a channel which is available presently. In the allocation of a bandwidth, a device which requires the allocation of a bandwidth computes the bandwidth desired. Then, the computed value is suggested to the IRM, and whether a bandwidth corresponding to the computed value is presently available is inquired. If the bandwidth is available, the bandwidth is used after the IRM is informed that the bandwidth will be used.

In FIG. 1, the DTV 100 corresponds to a device establishing an isochronous connection. For the allocation of a bandwidth, the DTV 100 primarily computes the bandwidth required for isochronous connection with the STB 110. In computing the bandwidth, more specifically, a bandwidth unit defined by the IEEE1394 standard, the DTV 100 reads the oPCR of the STB 110 and analyzes the values of fields of the oPCR, such as overhead identifier field Overhead_ID, data rate field and payload field. Then, the required bandwidth is computed according to the following formula defined in IEC61883 Part 1 Section 7.7.

BWU: IEEE1394 bandwidth unit

DR: data rate coefficient (16 for S100; 8 for S200; 4 for S400)

IF (oPCR.Overhead_ID>0)

BWU=32* oPCR.Overhead_ID+(oPCR.Payload+3)* DR;

ELSE

BWU=512+(oPCR. Payload+3)* DR;

By doing this, the DTV 100 computes the bandwidth required for connection with the STB 110 and uses the bandwidth for the connection when an IRM allocates the computed bandwidth to the DTV 100 in a network.

After an isochronous connection between the DTV 100 and the STB 110 is established, a user can view the selected programs, which are received from the STB 110, on the screen of the DTV 100. Thereafter, when the user operates a set-top box remote controller or a digital television remote controller (e.g., to turn off the power of the STB 110 or the DTV 100, or to select another device from a display for source selection on the screen of the DTV 100), the connection between the STB 110 and the DTV 100 is broken and system resources used for the connection are released. Since it is the DTV 100 which establishes the connection, it is also the DTV 100 which releases system resources. In other words, the DTV 100 communicates with an IRM and releases the channel and the bandwidth which were used for the connection.

A conventional isochronous connection method between a source device and a sink device has several problems. The conventional isochronous connection method does not define a solution for the case in which the bandwidth of an output bit stream changes according to the characteristics of a source device. For example, different bandwidths are required for transmission of an output bit stream by a set-top box, a digital television, etc., when the bit stream to be received or reproduced is of digital video (DV) format, when the bit stream is of motion picture experts group (MPEG)

format, when an MPEG format is a standard definition (SD), and when an MPEG format is a high level definition (HD). Presently, there is no teachings regarding how a bandwidth is allocated and released in this case. For the stability of an overall IEEE1394 network system, a source device establishes its registers base on the maximum bandwidth which the source device can cover. Then, a sink device is allocated the maximum bandwidth by an IRM in a network based on the registers of the source device, and releases the maximum bandwidth when breaking the connection later. However, this method for allocation/release of a bandwidth has a problems in that system resources are very inefficiently used. In other words, although many devices, for example, ten or more devices, may be connected, the connection of only a small number of devices, for example, three devices, exhausts system resources in a network by allocating a maximum bandwidth to each device. Consequently, only a small number of devices can be connected and operated.

SUMMARY OF THE INVENTION

To solve the above problems, it is an object of the present invention to provide a system resource management method for efficiently managing overall network system resources when system resources required for communication between a source device and a sink device are not fixed and may be changed, and more particularly, when a bandwidth required for transmission of the output bit stream of a source device may be changed, in a network system in which a digital interface is used for connection.

To achieve the above object in a first embodiment, the present invention provides a method for managing system resources required for communication between a source device and a sink device in a network system in which a digital interface is used for connection. The method includes the steps of (a) initially allocating system resources presently required to the source device, (b) monitoring the format of the output bit stream of the source device in a state in which communication between the two devices is maintained, (c) allocating additional system resources to the source device or releasing redundant system resources from the source device, under the lead of the source device when it is determined as a result of monitoring that the requirements for system resources have changed, and (d) detecting final system resources and releasing the detected system resources when communication between two devices is terminated.

In a second embodiment, the present invention provides a method for managing system resources required for communication between a source device and a sink device in a network system in which a digital interface is used for connection. The method includes the steps of (a) initially allocating system resources presently required to the source device, (b) monitoring the format of the output bit stream of the source device in a state in which communication between the two devices is maintained, (c) informing a device, which establishes the connection between the two devices, of the change in the requirements for system resources when it is determined as a result of monitoring that the requirements for system resources have changed, (d) allocating additional system resources to the source device or releasing redundant system resources from the source device, under the lead of the device which establishes the connection between the two devices, and (e) detecting final system resources and releasing the detected system resources when communication between two devices is terminated.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

The present invention relates to a method for managing system resources required for communication between a source device and a sink device which are changeable, rather than fixed, in a network system in which digital devices are connected through a digital interface such as IEEE1394.

Figure 2:
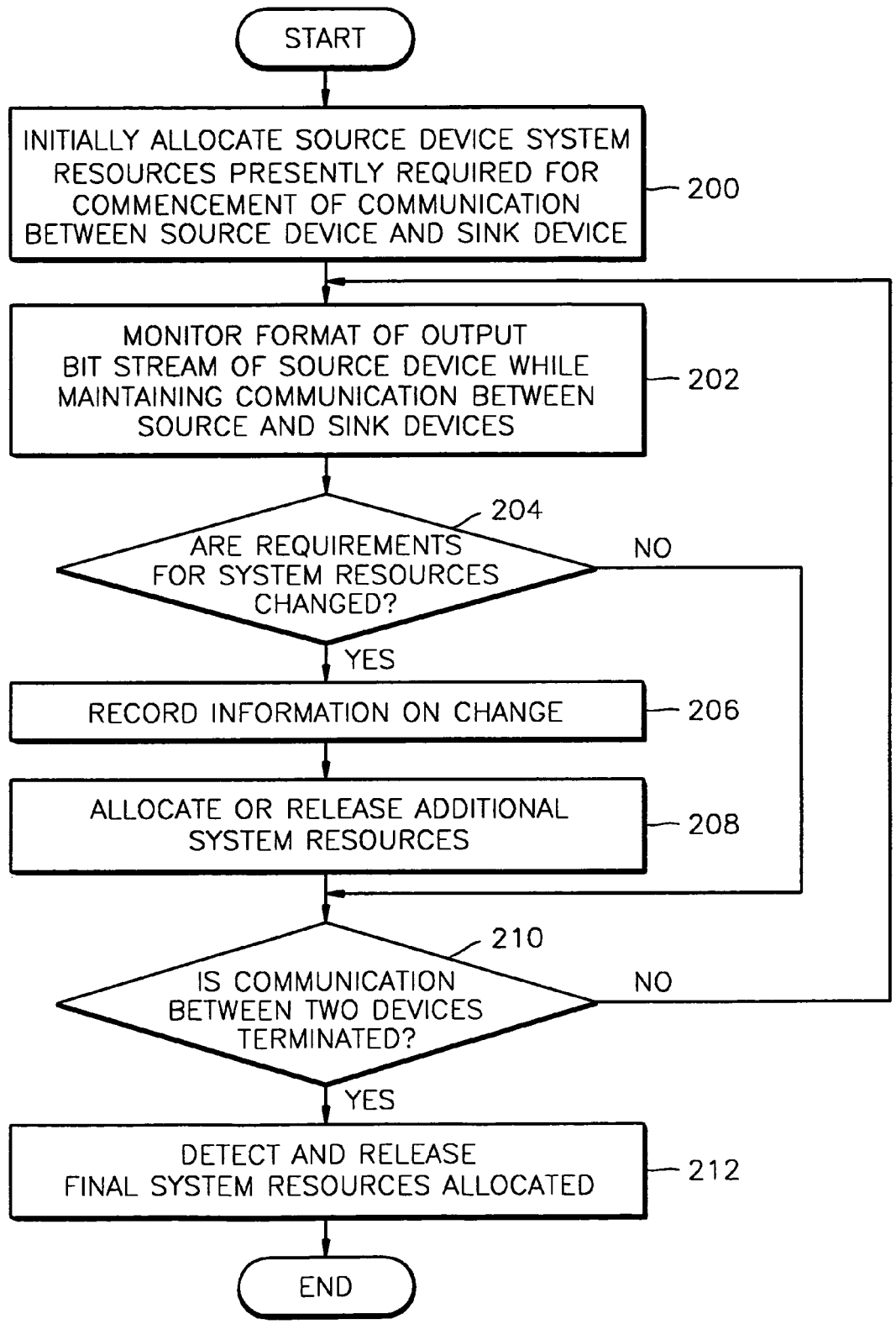
FIG. 2 is a flowchart for explaining a method for managing system resources according to an embodiment of the present invention.

Referring to FIG. 2, system resources presently required for commencement of communication between a source device and a sink device are initially allocated to the source device in step 200. Initial system resources, which correspond to values presently needed according to a present state of the source device, are allocated to the source device. Generally, for the allocation of a bandwidth as a system resource, a device to which a bandwidth will be allocated (i.e., the source device), computes the bandwidth desired. When the sink device takes charge of allocating initial system resources for the isochronous connection between the source device and the sink device, the sink device suggests the computed value to an isochronous resource manager (IRM) and sends an inquiry to the IRM regarding whether a bandwidth corresponding to the computed value is presently available in a network. If the bandwidth is available, the sink device informs the IRM that the bandwidth will be used and allows the source device to use the bandwidth.

While communications between the source device and the sink device are being maintained, the format of the output bit stream of the source device is monitored in step 202. This monitoring is performed because new requirements for system resources may be different than the previously allocated system resources, for some reason, such as the source device is designed to support various formats depending on change in channel. When the format of the output bit stream is changed as requirements for system resources are different than those of previously allocated ones, it is the source device itself that can recognize the change earliest.

As a result of monitoring in step 202, a determination is made as to whether the requirements for system resources are changed in step 204. If the requirements are changed, a device which can recognize this change, preferably, the source device, records information on the allocation of changed system resources in a predetermined storage location in an overall network in step 206. In step 208, the source device is allocated additional required system resources when the requirements for system resources increase, and the source device releases redundant system resources when the requirements for system resources decrease.

A determination is made as to whether communication between the source and sink devices is terminated, in step 210. After termination, the final system resources allocated for communication between the source and sink devices are detected and released in step 212. A device taking charge of releasing system resources, preferably the sink device, detects presently allocated system resources from the information on the allocation of system resources, which is recorded in the predetermined storage location, or equivalent/similar information. Then, the sink device releases an amount of system resources determined based on the detected system resources. If, in step 210, it is determined that communication between two devices is not terminated, the procedure turns back to step 202 and repeats the same steps.

Figure 1:
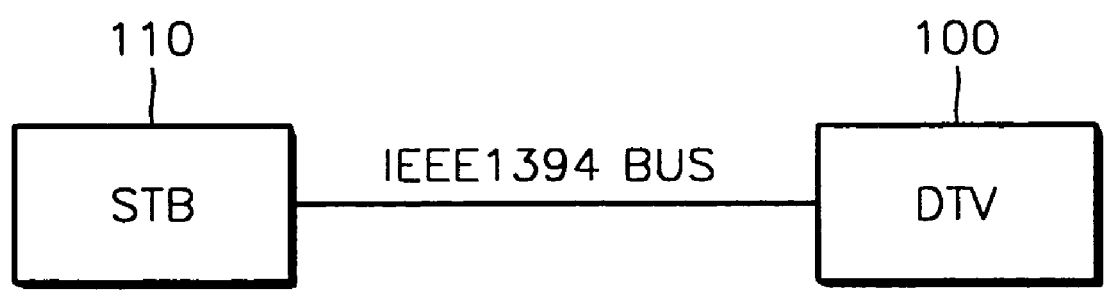
FIG. 1 is a diagram showing an example of a network system in which digital devices are connected through IEEE1394.

The following description concerns a method for managing system resources according to the embodiment described above when a source device is designed to support various formats of bit streams and when a bandwidth required for the transmission of a bit stream varies depending on the format of a bit stream output from the source device. Referring to FIG. 1, a set-top box (STB) 110, which is a source device, is connected to a digital television (DTV) 100, which is a sink device, through an IEEE1394 bus. A user operates a remote controller (not shown) for the DTV 100 or the STB 110 to select the STB 110 as the source device of the DTV 100. In the course of watching a particular program, the user may change the channel of the STB 110 using the remote controller for the STB 110. In this case, the STB 110 supports various different formats of bit streams, for example, DV, DSS, SD MPEG and HD MPEG, and the various different formats require different bandwidths for transmission.

The STB 110 records a value, which corresponds to a bandwidth for a bit stream which is broadcasted over a default channel thereof, in an output plug control register (oPCR), as a basis. When the connection between the STB 110 and the DTV 100 is established by the operation of the user, and thus a bandwidth is initially allocated for commencement of communication between the STB 110 and the CTV 100, the bandwidth recorded as the basis is allocated. For example, when the default channel of the STB 110 is channel 11, the channel supports an SD MPEG format, and the required bandwidth is 20 Mbps, a bandwidth of 20 Mbps is initially allocated.

Thereafter, it is supposed that the user changes the channel of the STB 110 to, for example, channel 22, using the remote controller, the channel 22 supports an HD MPEG format, and the required bandwidth is 40 Mbps. The STB 110, which can recognize the change in format and bandwidth earliest, operates such that the IRM of the network allocates a bandwidth of 20 Mbps required in addition to the existing bandwidth. The STB 110 records a value corresponding to a present bandwidth of 40 Mbps in the oPCR. When the allocation is unsuccessful, the bit stream of the channel is not transmitted and an appropriate error message is provided to the user.

Thereafter, it is supposed that the user changes the channel of the STB 110 to channel 33 using the remote controller and the bandwidth required for channel 33 is 8 Mbps. Then, the STB 110 releases the excess bandwidth of 32 Mbps among the previously used bandwidth and records a value corresponding to a present bandwidth of 8 Mbps in the oPCR.

When the user selects a device (not shown) other than the STB 110 as a source device of the DTV 100 or when the connection between the STB 110 and the DTV 100 is broken by the user turning off the power of the STB 110, a device taking charge of releasing system resources (i.e., the DTV 100), detects the amount of a bandwidth presently allocated and releases the detected amount of bandwidth.

In a method for managing system resources according to the embodiment of the present invention described above, additional allocation/release of system resources is performed by a device which can recognize a change in requirements for system resources earliest, that is, a source device. Since the source device understands its own state best, the source device can be implemented to manage system resources by itself. Meanwhile, in the general isochronous connection between a source device and a sink device, the sink device, as an establisher, performs allocation of system resources for initial connection, so that it may be considered to perform additional allocation/release of system resources under the lead of the sink device.

Figure 3:
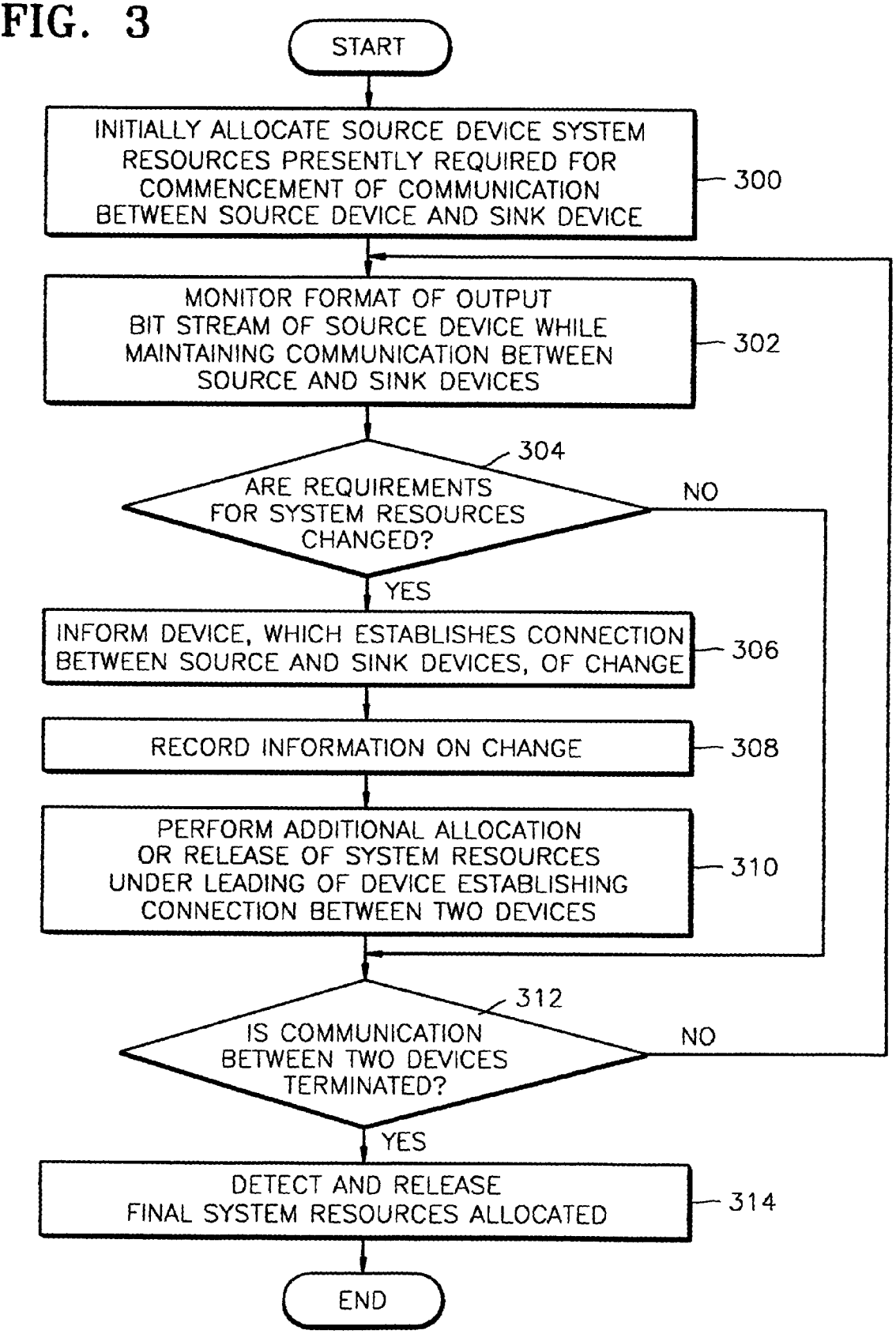
FIG. 3 is a flowchart for explaining a method for managing system resources according to another embodiment of the present invention.

FIG. 3 is a flowchart for explaining a method for managing system resources according to another embodiment of the present invention. Referring to FIG. 3, system resources presently required for commencement of communication between a source device and a sink device are initially allocated to the source device according to the present state of the source device, in step 300. While communications between the source device and the sink device are being maintained, the format of the output bit stream of the source device is monitored in step 302. These steps are performed in the same manner as those in the previous embodiment of the present invention.

As a result of monitoring in step 302, a determination is made as to whether the requirements for system resources are changed, in step 304. If the requirements are changed, a device which can recognize this change, preferably, the source device, informs a device which establishes the connection between the source and sink devices, preferably, the sink device, of the change in step 306. The source device also records information on the change in a predetermined storage location in an overall network in step 308.

When the device which establishes the connection, is informed of the change, it allocates additional system resources as required by the source device, or releases redundant system resources of the source device, based on information substantially the same as the information recorded in the predetermined storage location in step 310.

A determination is made as to whether communication between the source and sink devices is terminated, in step 312. After termination, the final system resources allocated for communication between the source and sink devices are detected and released in step 314. A device taking charge of releasing system resources, preferably the sink device, detects presently allocated system resources from the information on the allocation of system resources, which is recorded in the predetermined storage location, or equivalent/similar information. Then, the sink device releases an amount of system resources determined based on the detected system resources. If, in step 312, it is determined that the communication between two devices is not terminated, the procedure turns back to step 302 and repeats the same steps.

A method for managing system resources according to the above second embodiment of the present invention will be described in detail with reference to FIG. 1. The initial allocation of a bandwidth of the STB 110 is the same as that in the first embodiment, and thus a description thereof will be omitted.

A user operates a remote controller for the DTV 100 or the STB 110 to select the STB 110 as the source device of the DTV 100. In the course of watching a particular program, the user may change the channel of the STB 110 using the remote controller for the STB 110. In this case, the initial connection between the STB 110 and the DTV 100 is established by the DTV 100.

It is supposed that the user changes the channel of the STB 110, for example, from channel 11 to channel 22, using the remote controller, and the bandwidth required for channel 22 is 40 Mbps while the bandwidth required for channel 11 is 20 Mbps. In this case, the STB 110, which can recognize change in format and bandwidth earliest, informs the DTV 100, which establishes the connection between the two devices, of the change, and records a value corresponding to 40 Mbps in its oPCR. The STB 110 informs the DTV 100 of a change in its state because the DTV 100 usually establishes the STB 110 to inform the DTV 100 if the state of the STB 110 is changed. However, the reasons are not limited to this.

When the DTV 100 is informed of the change in state of the STB 110, the DTV 100 reads the oPCR of the STB 110 and detects that a bandwidth of 40 Mbps is required presently. The DTV 100 operates such that it is allocated a bandwidth of 20 Mbps, which is required in addition to the existing bandwidth, by the IRM of the network.

Thereafter, it is supposed that the user changes the channel of the STB 110 to channel 33 using the remote controller, and the bandwidth required for channel 33 is 8 Mbps. Similarly, the STB 110 informs the DTV 100 of this fact and records a value corresponding to 8 Mbps in its oPCR. When the DTV 100 is informed of the change in state of the STB 110, the DTV 100 reads the oPCR of the STB 110 and detects that a bandwidth of 8 Mbps is required presently. The DTV 100 releases the redundant bandwidth of 32 Mbps.

When the user selects a device (not shown) other than the STB 110 as a source device of the DTV 100 or when the connection between the STB 110 and the DTV 100 is broken by the user turning off the power of the STB 110, a device taking charge of releasing system resources, that is, the DTV 100, detects the amount of bandwidth presently allocated and releases the detected amount of bandwidth. The DTV 100 may compute a bandwidth, which is actually allocated presently, by reading the oPCR of the STB 110 and computing a bandwidth based on the result. Alternatively, the DTV 100 may continuously hold information on a bandwidth which it allocates for the connection.

Figure 4:
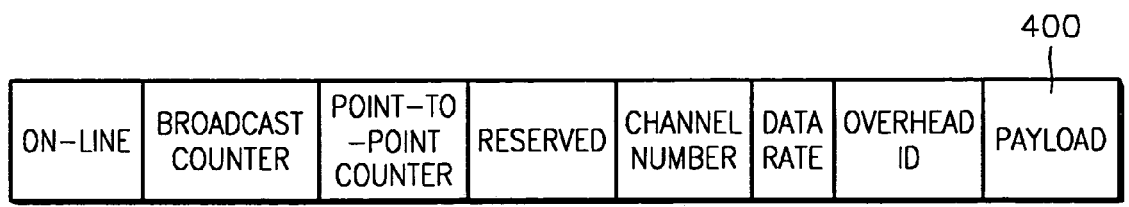
FIG. 4 shows a data format of an output plug control register (oPCR).

FIG. 4 shows the data format of an oPCR. The oPCR shown in FIG. 4 is defined by the IEC61883 standard which defines connection management between digital devices in an IEEE1394 network system. A value corresponding to the bandwidth initially allocated to a source device is recorded in a payload field 400 among the fields of the oPCR. When the bandwidth initially allocated is changed, the payload field 400 of the oPCR is updated based on the bandwidth of an output bit stream.

The embodiments of a method for managing system resources according to the present inventions can be made into programs which can be executed in a computer. The programs can be read from a computer-readable medium and executed by a universal digital computer system. The computer-readable medium could be a storage medium such as a magnetic storage medium (e.g., ROM, a floppy disk or a hard disk), an optical readable medium (e.g., CD-ROM or DVD), or a carrier wave (e.g., transmission through the Internet).

As described above, a method for managing system resources according to the present invention has the advantage of efficiently managing system resources in a network system in which digital devices are connected through a digital interface such as IEEE1394.

What is claimed is:

1. A method for managing system resources required for communication between a source device and a sink device in a network system in which a digital interface is used for connection between the source device and the sink device, the method comprising the steps of:
    (a) allocating to the source device system resources presently required for commencement of communication between the source device and the sink device, wherein the allocating is performed by the sink device;
    (b) monitoring at the source device a format of the output bit stream of the source device while communications are being maintained between the source device and the sink device to determine if requirements for the system resources have changed;
    (c) allocating at the source device additional system resources to the source device or releasing at the source device redundant system resources from the source device, if it is determined as a result of monitoring that the requirements for the system resources have changed; and
    (d) detecting at the sink device final system resources allocated for communication between the source device and the sink device and releasing at the sink device the detected final system resources, when communication between the source device and the sink device is terminated.

2. The method of claim 1, wherein the step (c) further comprises recording at the source device information regarding a change in requirements for the system resources in a predetermined storage location of the source device, and, the step (d) further comprises detecting final system resources at the sink device based on the information recorded in the predetermined storage location of the source device.

3. The method of claim 2, wherein the predetermined storage location is an output plug control register which is defined according to an IEC61883 standard, which defines management of connections between digital devices in an IEEE1394 network system, wherein the step (c) further comprises updating a payload field of the output plug control register based on a bandwidth of the output bit stream when the bandwidth, which is initially allocated as one of the system resources in the step (a), is changed.

4. The method of claim 1, wherein in the step (c), said releasing, at the source device, of said redundant system resources comprises releasing excessive bandwidth.

5. A method for managing system resources required for communication between a source device and a sink device in a network system in which a digital interface is used for connection between the source device and the sink device, the method comprising the steps of:
    (a) allocating to the source device system resources presently required for commencement of communication between the source device and the sink device, wherein the allocating is performed by the sink device;
    (b) monitoring at the source device a format of the output bit stream of the source device while communications are being maintained between the source device and the sink device to determine if requirements for the system resources have changed;
    (c) informing the sink device of the change in the requirements for the system resources if it is determined as a result of monitoring that the requirements for the system resources have changed;

(d) allocating additional system resources to the source device or releasing redundant system resources from the source device, at the sink device if it is determined as a result of monitoring that the requirements for the system resources have changed; and (e) detecting at the sink device final system resources and releasing at the sink the detected system resources when communication between the source device and the sink device is terminated.

6. The method of claim 5, wherein the step (e) further comprises determining if communication between the source and sink devices has been terminated.

7. The method of claim 5, wherein the step (c) further comprises recording at the source device information regarding the change in the requirements for the system resources in a predetermined storage location of the source device, the step (d) further comprises reading at the sink device the information regarding the change in the requirements for the system resources from the predetermined storage location of the source device, and the step (e) further comprises detecting the final system resources at the sink device based on the information recorded in the predetermined storage location.

8. The method of claim 7, wherein the predetermined storage location is an output plug control register which is defined according to an IEC61883 standard, which defines management of connections between digital devices in an IEEE1394 network system, wherein a payload field of the output plug control register is updated based on a bandwidth of the output bit stream when the bandwidth, which is initially allocated as one of the system resources in the step (a), is changed.

\* \* \* \* \*